United States Patent
Fernandez et al.

(10) Patent No.: US 9,810,474 B2
(45) Date of Patent: Nov. 7, 2017

(54) JOINT MEMBERS FOR REFRIGERATOR APPLIANCE CASINGS

(71) Applicant: General Electric Company, Schenectady, NY (US)

(72) Inventors: Ronald Fernandez, Louisville, KY (US); Stephen Bernard Froelicher, Shepherdsville, KY (US); Krishnamurthi Seeni, Norwood, MA (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 45 days.

(21) Appl. No.: 14/723,500

(22) Filed: May 28, 2015

(65) Prior Publication Data

US 2016/0348958 A1 Dec. 1, 2016

(51) Int. Cl.
| F25D 23/06 | (2006.01) |
| A47B 47/00 | (2006.01) |
| F16B 5/00 | (2006.01) |
| F25D 23/00 | (2006.01) |

(52) U.S. Cl.
CPC .......... *F25D 23/006* (2013.01); *F16B 5/0028* (2013.01); *F25D 23/062* (2013.01); *F25D 2400/04* (2013.01); *F25D 2400/40* (2013.01)

(58) Field of Classification Search
CPC .. F25D 23/062; F25D 23/063; F25D 2400/04; F16B 5/0028
USPC .......... 312/406.2, 257.1, 263, 265.5
See application file for complete search history.

(56) References Cited

U.S. PATENT DOCUMENTS

| 3,014,611 | A | * | 12/1961 | Marshall | F25D 23/064 |
| | | | | | 220/592.1 |
| 3,588,214 | A | * | 6/1971 | Stimamiglio | F25D 23/064 |
| | | | | | 312/406 |
| 3,707,243 | A | * | 12/1972 | Kitson | F25D 23/066 |
| | | | | | 220/592.1 |
| 4,045,104 | A | * | 8/1977 | Peterson | A47B 47/03 |
| | | | | | 211/182 |
| 4,072,374 | A | * | 2/1978 | True, Jr. | F16B 2/22 |
| | | | | | 248/222.12 |
| 4,134,627 | A | * | 1/1979 | Kuskowski | F25D 23/085 |
| | | | | | 312/236 |
| 4,281,883 | A | * | 8/1981 | Zacky | A47F 3/005 |
| | | | | | 312/140 |

(Continued)

*Primary Examiner* — Leslie A Nicholson, III
*Assistant Examiner* — Kimberley S Wright
(74) *Attorney, Agent, or Firm* — Dority & Manning, P.A.

(57) ABSTRACT

Refrigerator casings and joint members therefor are provided. A joint member includes a body extending between a first end and a second end generally along a lateral direction. The body further includes a forward face and an aft face spaced apart from the forward face along a transverse direction, and further includes a top surface and a bottom surface spaced apart from the top surface along a vertical direction. The joint member further includes a plurality of barrier channels defined in the body, each of the plurality of barrier channels extending generally along the lateral direction between the first end and the second end. The joint member further includes a plurality of tube channels defined in the body, each of the plurality of tube channels extending generally along the vertical direction between the top surface and the bottom surface.

18 Claims, 7 Drawing Sheets

(56) References Cited

U.S. PATENT DOCUMENTS

| | | | | |
|---|---|---|---|---|
| 4,348,068 | A * | 9/1982 | Hawkins | F25D 23/062 312/236 |
| 4,586,348 | A * | 5/1986 | Nakayama | F25D 21/04 220/592.1 |
| 4,632,470 | A * | 12/1986 | Jenkins | F25D 23/062 29/525.12 |
| 4,768,845 | A * | 9/1988 | Yeh | A47B 47/0008 312/257.1 |
| 4,782,637 | A * | 11/1988 | Eriksson | E04B 1/3483 312/111 |
| 4,822,117 | A * | 4/1989 | Boston, Jr. | F25D 23/062 29/455.1 |
| 4,836,626 | A * | 6/1989 | Taylor | A47B 47/03 312/257.1 |
| 5,000,010 | A | 3/1991 | Powell et al. | |
| RE34,393 | E * | 9/1993 | McIlwraith | H02B 1/16 312/265.4 |
| 5,368,381 | A * | 11/1994 | Mandel | F25D 23/062 312/406.2 |
| 6,053,586 | A * | 4/2000 | Cook | E05B 65/006 292/146 |
| 6,157,532 | A * | 12/2000 | Cook | E05B 65/006 292/146 |
| 6,341,830 | B1 * | 1/2002 | Chun | F25D 23/063 312/263 |
| 6,550,879 | B1 * | 4/2003 | Kurrasch | A47B 47/02 312/257.1 |
| 6,655,766 | B2 * | 12/2003 | Hodges | F25D 23/085 312/406.2 |
| 6,773,082 | B2 * | 8/2004 | Lee | F25D 23/063 312/401 |
| 7,182,417 | B2 * | 2/2007 | Taylor | F25D 23/062 312/406.2 |
| 8,042,890 | B2 * | 10/2011 | Collins | A47B 47/0075 312/257.1 |
| 8,403,431 | B2 * | 3/2013 | Elkins | H05K 7/186 211/26 |
| 8,616,661 | B2 * | 12/2013 | Takata | H02B 1/28 174/50 |
| 9,285,157 | B2 * | 3/2016 | Selin | F25D 19/00 |
| 9,383,016 | B2 * | 7/2016 | Schaaf | H02B 1/28 |
| 2003/0080662 | A1 * | 5/2003 | Taylor | F25D 23/062 312/406.2 |
| 2003/0141793 | A1 * | 7/2003 | Lee | F25D 23/063 312/401 |
| 2011/0050052 | A1 * | 3/2011 | Elkins | H04Q 1/09 312/223.1 |
| 2011/0126569 | A1 * | 6/2011 | Selin | F25D 23/085 62/272 |
| 2011/0126571 | A1 * | 6/2011 | Selin | F25D 23/063 62/272 |
| 2011/0162403 | A1 * | 7/2011 | Selin | F25D 23/066 62/264 |
| 2013/0146321 | A1 * | 6/2013 | Takata | H02B 1/28 174/50 |

* cited by examiner

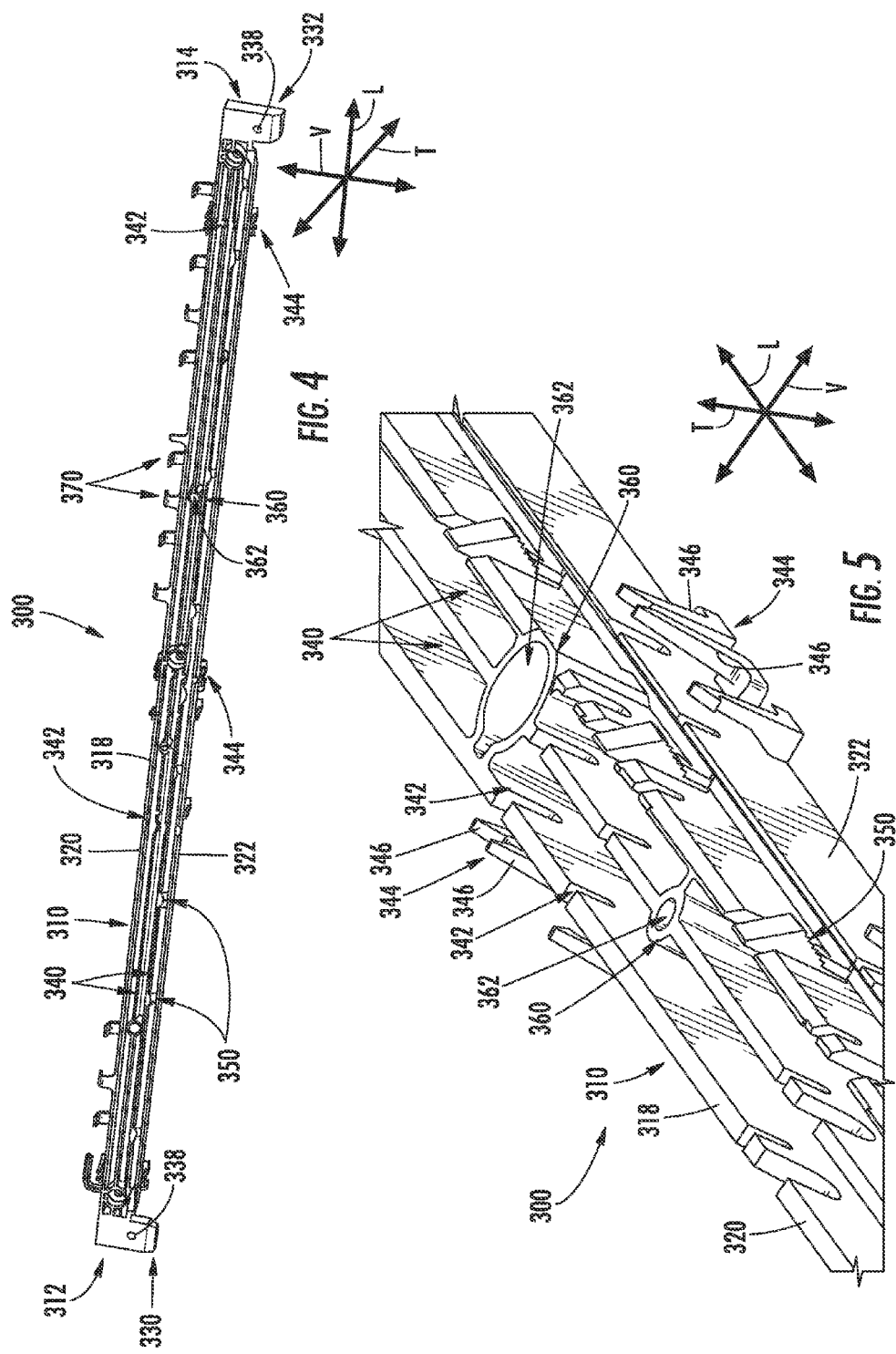

JOINT MEMBERS FOR REFRIGERATOR APPLIANCE CASINGS

FIELD OF THE INVENTION

The present subject matter relates generally to refrigerator appliances, and more particularly to joint members for joining casing bottoms and back walls of panelized refrigerator casings.

BACKGROUND OF THE INVENTION

Refrigerator appliances generally included cabinets that define chilled chamberd for receipt of food items for storage. For example, a cabinet can define a fresh food chamber and/or a freezer chamber. The fresh food chamber can be maintained at a temperature greater than the freezing point of water. Conversely, the freezer chamber can be maintained at a temperature equal to or less than the freezing point of water.

In many refrigerator appliances, a casing houses the cabinet(s) and the machinery (such as the refrigeration cycle components) of the refrigeration appliance. The casing can, for example, be formed from a plurality of panel walls which define an interior in which the cabinets are positioned. Additionally, a casing bottom can further define the interior in which the cabinets are positioned, and can define a machinery component in which machinery such as the refrigeration cycle components are positioned.

Various issues can occur during assembly of refrigeration appliances which utilize panelized casings. For example, the back wall and the casing bottom are typically directly joined together through the use of screws, rivets, etc. This approach to such assembly can, however lead to foam leakage through the back wall-casing bottom intersection and through the holes created by the screws, rivets, etc. when foam is added to the refrigeration appliance between the casing and the cabinet. Additionally, tubing for various purposes, such as for flowing refrigerant therethrough, may need to extend across the back wall-casing bottom intersection and be properly positioned for coupling to machinery components in the machinery compartment. However, in many cases foaming causes movement of the tubing, leading to difficulties in subsequent coupling. Still further, in many cases, wiring may extend across the back wall-casing bottom intersection for providing electrical power, etc., to various components. The screws, rivets, etc. utilized to join the back wall and casing bottom, however, may in some cases contact and potentially damage the wires.

Accordingly, improved casings for refrigerator appliances are desired in the art. In particular, casings with reduced foam leakage, improved tubing positioning features, and improved features for safeguarding wiring of associated refrigerator appliances would be advantageous.

BRIEF DESCRIPTION OF THE INVENTION

Aspects and advantages of the invention will be set forth in part in the following description, or may be apparent from the description, or may be learned through practice of the invention.

In accordance with one embodiment, a refrigerator casing is provided. The refrigerator casing includes a main casing body, the main casing body including a first sidewall, a second sidewall spaced apart from the first sidewall along a lateral direction, and a top wall extending between the first sidewall and the second sidewall. The refrigerator casing further includes a casing bottom connected to the main casing body, the casing bottom comprising an upper flange extending generally along the lateral direction between the first sidewall and the second sidewall. The refrigerator casing further includes a back wall connected to the main casing body, the back wall including a lower flange extending generally along the lateral direction between the first sidewall and the second sidewall. The refrigerator casing further includes a joint member. The joint member includes a body extending between a first end and a second end generally along the lateral direction, the joint member connected to the upper flange and the lower flange.

In accordance with another embodiment, a joint member for joining a casing bottom and a back wall of a refrigerator appliance casing is provided. The joint member includes a body extending between a first end and a second end generally along a lateral direction. The body further includes a forward face and an aft face spaced apart from the forward face along a transverse direction, and further includes a top surface and a bottom surface spaced apart from the top surface along a vertical direction. The joint member further includes a plurality of barrier channels defined in the body, each of the plurality of barrier channels extending generally along the lateral direction between the first end and the second end. The joint member further includes a plurality of tube channels defined in the body, each of the plurality of tube channels extending generally along the vertical direction between the top surface and the bottom surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 4 provides a perspective view of a joint member for a casing of a refrigerator appliance in accordance with one embodiment of the present disclosure;

FIG. 5 provides a close-up perspective view of a portion of a joint member for a casing of a refrigerator appliance in accordance with one embodiment of the present disclosure;

DETAILED DESCRIPTION

Figure 1:
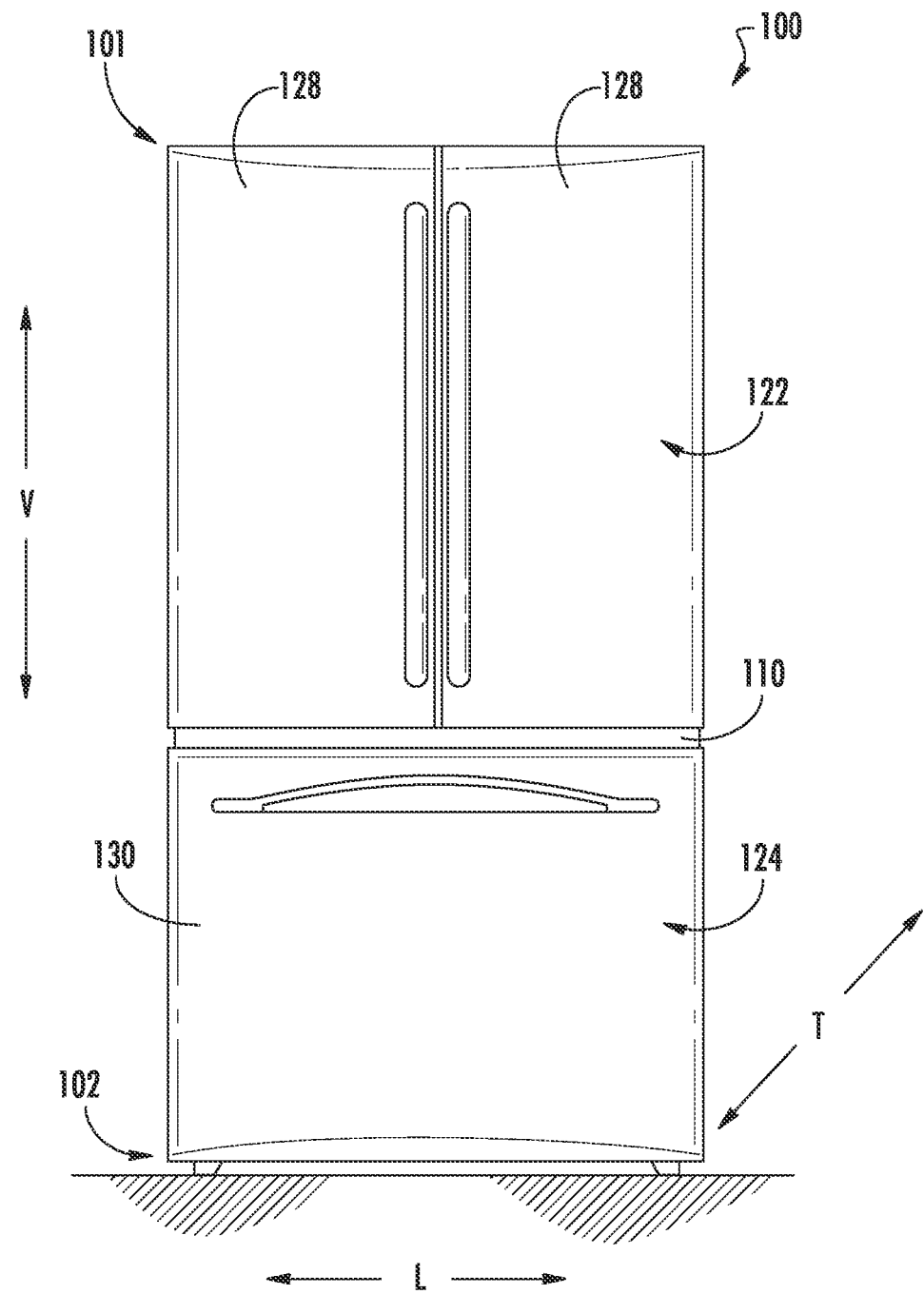
FIG. 1 provides a front, elevation view of a refrigerator appliance with doors in closed positions in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
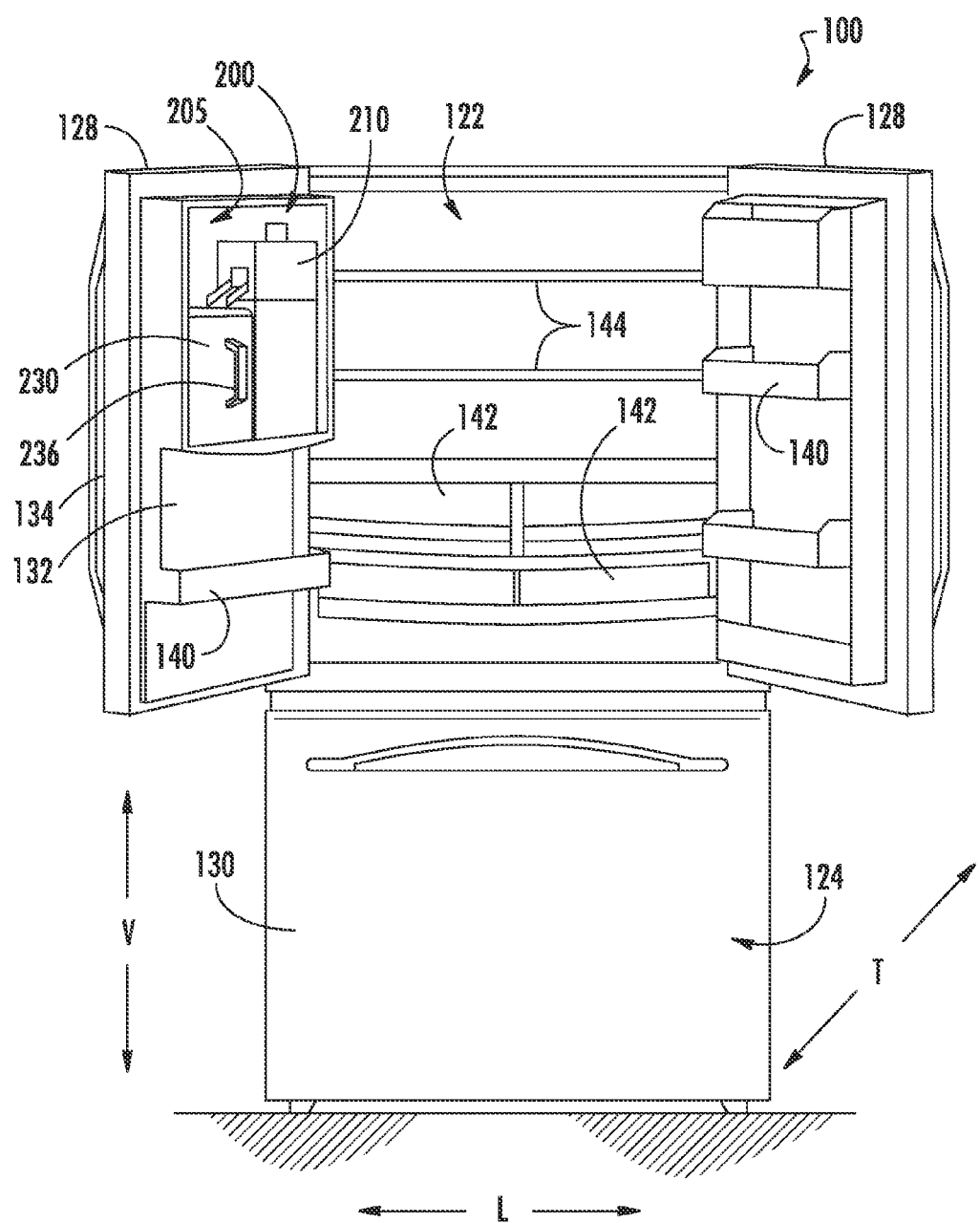
FIG. 2 provides a front, elevation view of the refrigerator appliance of FIG. 1 with doors of the refrigerator appliance shown in open positions to reveal a fresh food chamber of the refrigerator appliance and an ice making assembly in accordance with one embodiment of the present disclosure.

FIG. 1 provides a front, elevation view of a refrigerator appliance 100 according to an exemplary embodiment of the present subject matter with refrigerator doors 128 of the refrigerator appliance 100 shown in a closed position. FIG. 2 provides a front, elevation view of refrigerator appliance 100 with refrigerator doors 128 shown in an open position to reveal a fresh food chamber 122 of refrigerator appliance 100. As discussed in greater detail below, refrigerator appliance 100 includes an ice making assembly 200. In some embodiments as shown, the ice making assembly 200 can be positioned, when the doors 128 are in closed positions, generally within or adjacent to a fresh food chamber 122 of refrigerator appliance 100. Alternatively, however, the ice making assembly 200 can be positioned, when the doors 128 are in closed positions, generally within or adjacent to a freezer chamber 124 of refrigerator appliance 100.

Refrigerator appliance 100 includes a casing 110 that extends between a top portion 101 and a bottom portion 102 along a vertical direction V. Casing 110 generally houses one or more cabinets 112 which define chilled chambers for receipt of food items for storage. In particular, as shown, cabinet 112 defines fresh food chamber 122 positioned at or adjacent top portion 101 of casing 110 and a freezer chamber 124 arranged at or adjacent bottom portion 102 of casing 110. Fresh food chamber 122 is thus in these embodiments disposed above freezer chamber 124 along the vertical direction V. As such, refrigerator appliance 100 is generally referred to as a bottom mount refrigerator appliance. It is recognized, however, that the benefits of the present disclosure apply to other types and styles of refrigerator appliances such as, e.g., a top mount refrigerator appliance or a side-by-side style refrigerator appliance. Consequently, the description set forth herein is for illustrative purposes only and is not intended to be limiting in any aspect to any particular refrigerator chamber configuration.

A lateral direction L and a transverse direction T may each be defined for refrigerator appliance 100, as illustrated in FIGS. 1 and 2. The vertical, lateral and transverse directions V, L, T may be mutually orthogonal.

One or more refrigerator doors 128 are rotatably mounted or hinged to an edge of casing 110 for selectively accessing fresh food chamber 122. Each door 128 may include an inner surface 132 and an outer surface 134, between which the door 128 is generally defined. In addition, one or more freezer doors 130 are arranged below refrigerator doors 128 for selectively accessing freezer chamber 124. Freezer door 130 is coupled to a freezer drawer (not shown) slidably mounted within freezer chamber 124. As discussed above, refrigerator doors 128 and freezer door 130 are shown in the closed position in FIG. 1, and refrigerator doors 128 are shown in the open position in FIG. 2.

Turning now to FIG. 2, various storage components are mounted within fresh food chamber 122 to facilitate storage of food items therein as will be understood by those skilled in the art. In particular, the storage components include drawers 142 and racks 144 that are mounted within fresh food chamber 122. Bins 140 may additionally be provided, such as mounted on doors 128, and may be disposed within fresh food chamber 122 when the doors 128 are in the closed position. Bins 140, drawers 142, and racks 144 are configured for receipt of food items (e.g., beverages and/or solid food items) and may assist with organizing such food items. As an example, drawers 142 can receive fresh food items (e.g., vegetables, fruits, and/or cheeses) and increase the useful life of such fresh food items.

As may be seen in FIG. 2, an ice making assembly 200 according to an exemplary embodiment of the present subject matter is included in refrigerator appliance 100. Ice making assembly 200 may be disposed within the fresh food chamber 122, the freezer chamber 124, or a door 128, 130. In exemplary embodiments, as discussed herein, ice making assembly 200 may be disposed within a door 128. Thus, ice-making assembly 200 can be positioned within fresh-food chamber 122, e.g., when refrigerator doors 128 are closed. Ice-making assembly 200 is generally configured for producing ice, as is generally understood.

In embodiments wherein ice-making assembly 200 is disposed within a door 128, ice-making assembly 200 generally includes an ice box 205, which is generally an area defined in one of the doors 128. Various components of the ice-making assembly 200, such as an ice maker 210 and a container 230 (which may include a handle 236), may be disposed within the ice box 205. Ice maker 210 is configured for producing ice. As an example, ice maker 210 can be a nugget or auger style ice maker. Ice box 205 and ice maker 210 may, in the embodiment shown, be positioned within fresh food chamber 122 when refrigerator doors 128 are closed.

Figure 3:
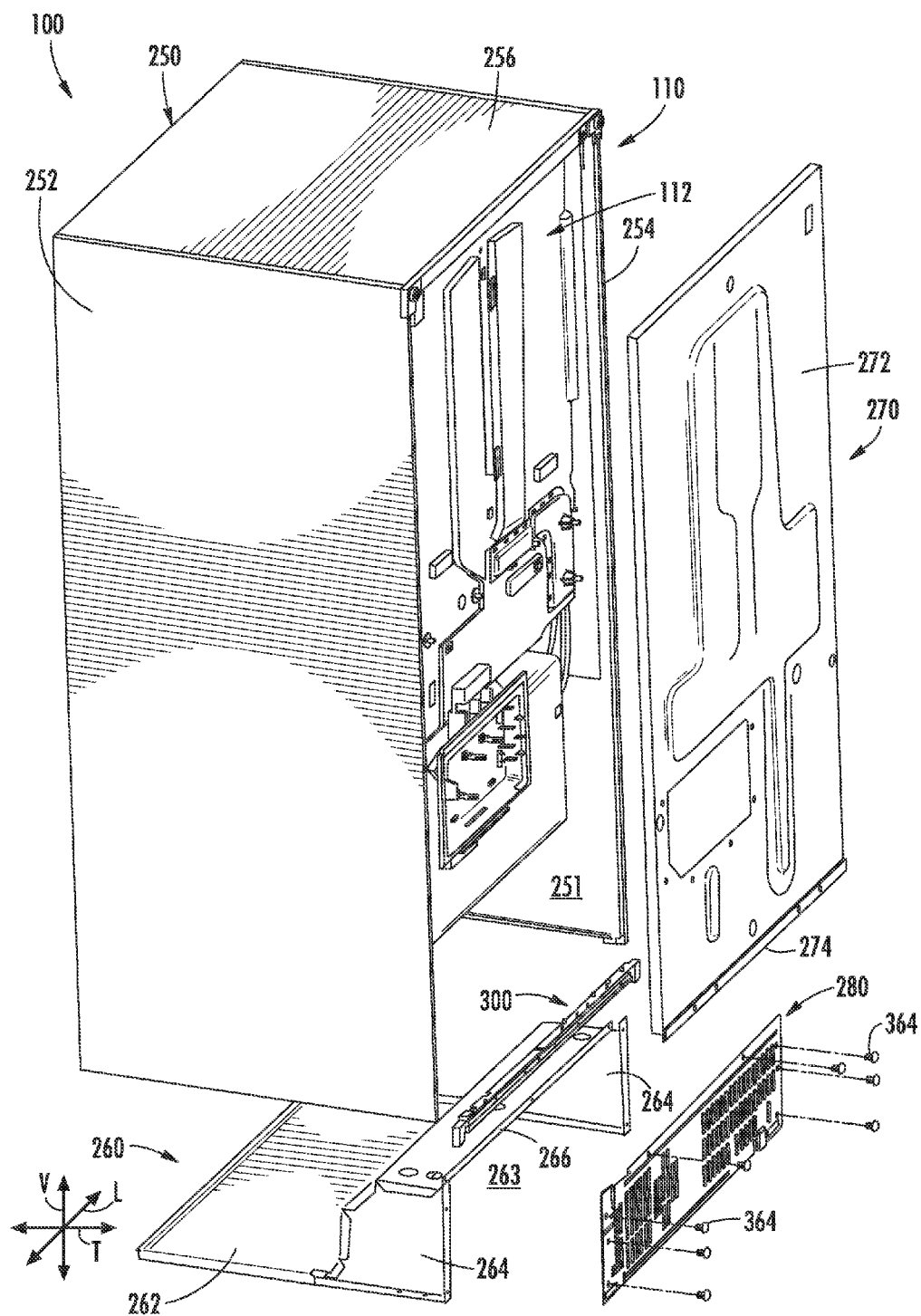
FIG. 3 provides a back exploded perspective view of a refrigerator assembly in accordance with one embodiment of the present disclosure.

Referring now to FIG. 3, an exploded view of casing 110, with cabinets 112 disposed therein, is provided. Casing 110 generally includes a main casing body 250, which may define a casing interior 251 and include a first sidewall 252, a second sidewall 254, and a top wall 256. The first and second sidewalls 252, 254 may be spaced apart from each other along the lateral direction L, and the top wall 256 may extend between the first sidewall 252 and second sidewall 254, such as at the top 101 of refrigerator appliance 100. The sidewalls 252, 254 and top wall 256 may be integral, and thus formed from a single component, or may be separate components that are connected together, such as via suitable mechanical fasteners (such as screws, rivets, nut-bolt combinations, etc), bonding, etc. Main casing body 250 (and the components thereof) may be formed from a suitable metal, plastic, or other suitable material.

Casing 110 may further include casing bottom 260, which may when assembled be connected to the main casing body 250 (such as via suitable mechanical fasteners (such as screws, rivets, nut-bolt combinations, etc), bonding, etc.). The casing bottom 260 may, for example, include a bottom wall 262 which may further define the casing interior 251 on one side thereof and a machinery compartment 263 on an opposing side thereof. Bottom sidewalls 264 may additionally define the machinery compartment 263. Casing bottom 260 may additionally include, for example, an upper flange 266. The upper flange 266 may extend, such as generally in the vertical direction V from the bottom wall 262, and may further extend generally along the lateral direction L between the first sidewall 252 and the second sidewall 254. In exemplary embodiments, casing bottom 260 (and the components thereof) may be formed from a suitable metal, although in alternative embodiments casing bottom 260 may be formed from a plastic or other suitable material.

Casing 110 may additionally include a back wall 270, which may when assembled be connected to the main casing body 250 (such as via suitable mechanical fasteners (such as screws, rivets, nut-bolt combinations, etc), bonding, etc.). Back wall 270 may include a body 272 which may extend between the first sidewall 252 and the second sidewall 254. Additionally, a lower flange 274 may extend, such as generally in the transverse direction T from the body 272, and may further extend generally along the lateral direction L between the first sidewall 252 and the second sidewall 254.

Further, casing 110 may additionally include a machinery compartment cover plate 280. The cover plate 280 may, when assembled, be connected to the casing bottom 260 (such as via suitable mechanical fasteners (such as screws, rivets, nut-bolt combinations, etc), bonding, etc.). Cover plate 280 may additionally be connected to a joint member 300, as discussed herein. Cover plate 280 may further define the machinery compartment 263.

Referring now to FIGS. 3 through 9, the present disclosure is further directed to joint members 300 for joining the casing bottom 260 and the back wall 270. In particular, the joint member 300 may, when assembled, be connected to the upper flange 266 of the casing bottom 260 and the lower flange 274 of the back wall 270. Joint members 300 in accordance with the present disclosure may provide numerous advantages with regard to refrigerator appliance 100 assembly. For example, as discussed herein, a joint member 300 may reduce or prevent foam leakage. Further, joint member 300 may reduce movement of tubes 302, thus improving the accuracy and ease of coupling such tubes 302 to various components in the machinery compartment 263. Still further, joint member 300 may reduce or prevent the risk of damage to wires 304 of refrigerator appliance 100.

In exemplary embodiments, joint members 300 in accordance with the present disclosure are formed from suitable plastics, such as in some embodiments polyvinyl chloride or other suitable plastics having high flame ratings.

Joint member 300 may include, for example, a body 310 which extends between a first end 312 and a second end 314 along the lateral direction L. Body 310 may have a forward face 316 and an aft face 318 which are spaced apart along the transverse direction T, as well as a top surface 320 and a bottom surface 322 which are spaced apart along the vertical direction V.

Figure 6:
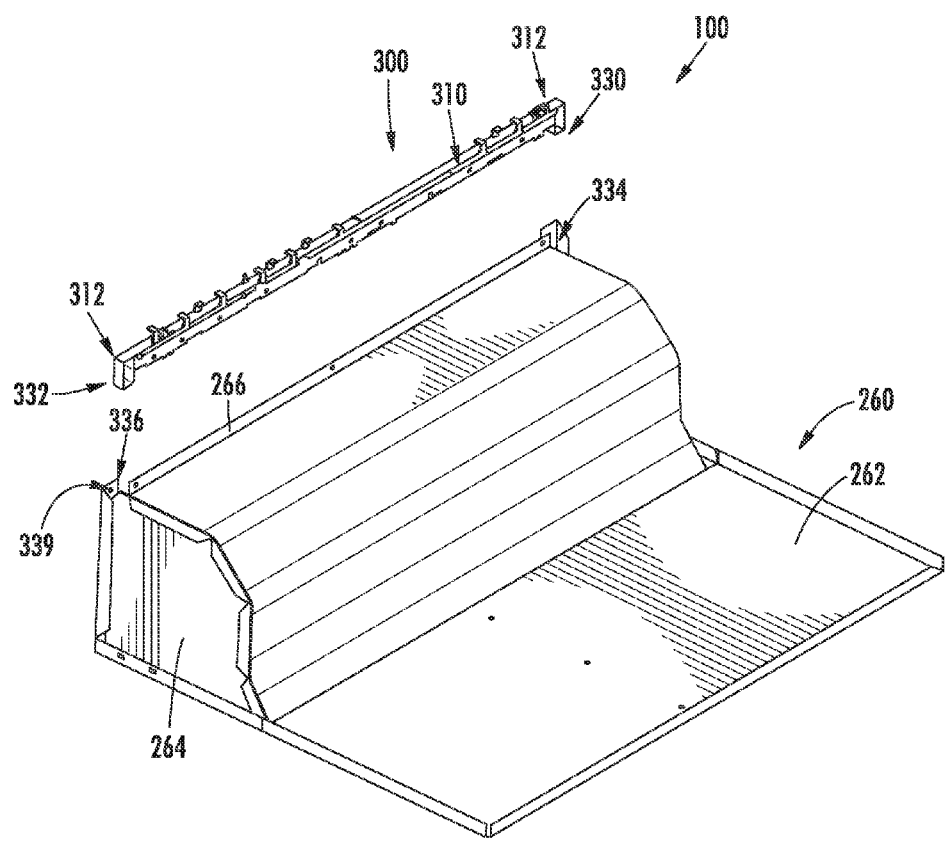
FIG. 6 provides an exploded perspective view of a joint member and casing bottom of a refrigerator appliance in accordance with one embodiment of the present disclosure.

Referring now to FIGS. 4 and 6, joint member 300 may include a first protrusion 330 and a second protrusion 332. The first and second protrusions 330, 332 may extend from the body 310, such as along the vertical direction V. First protrusion 330 and second protrusion 332 may be spaced apart along the lateral direction L. For example, first protrusion 330 may be disposed at the first end 312, while second protrusion 332 may be disposed at the second end 314. In exemplary embodiments, protrusions 330, 332 are integral with body 310, although alternatively the protrusions 330, 332 may be separate components connected to the body 310.

A first pocket 334 and a second pocket 336 may be defined in the casing bottom 260, as shown. In exemplary embodiments the pockets 334, 336 may align with the protrusions 330, 332, such that when assembled, the first protrusion 330 may be disposed within the first pocket 334 and the second protrusion 332 may be disposed within the second pocket 336. Such interaction may connect the joint member 300 and casing bottom 260.

Additionally, detents 338 may be disposed on protrusions 330, 332. The detents 338 may, when assembled, extend through apertures 339 defined in the casing bottom 260. The alignment of detents 338 and apertures 339, and the extension of detents 338 through apertures 339 when assembled, may further connect the joint member 300 and casing bottom 260.

Figure 8:
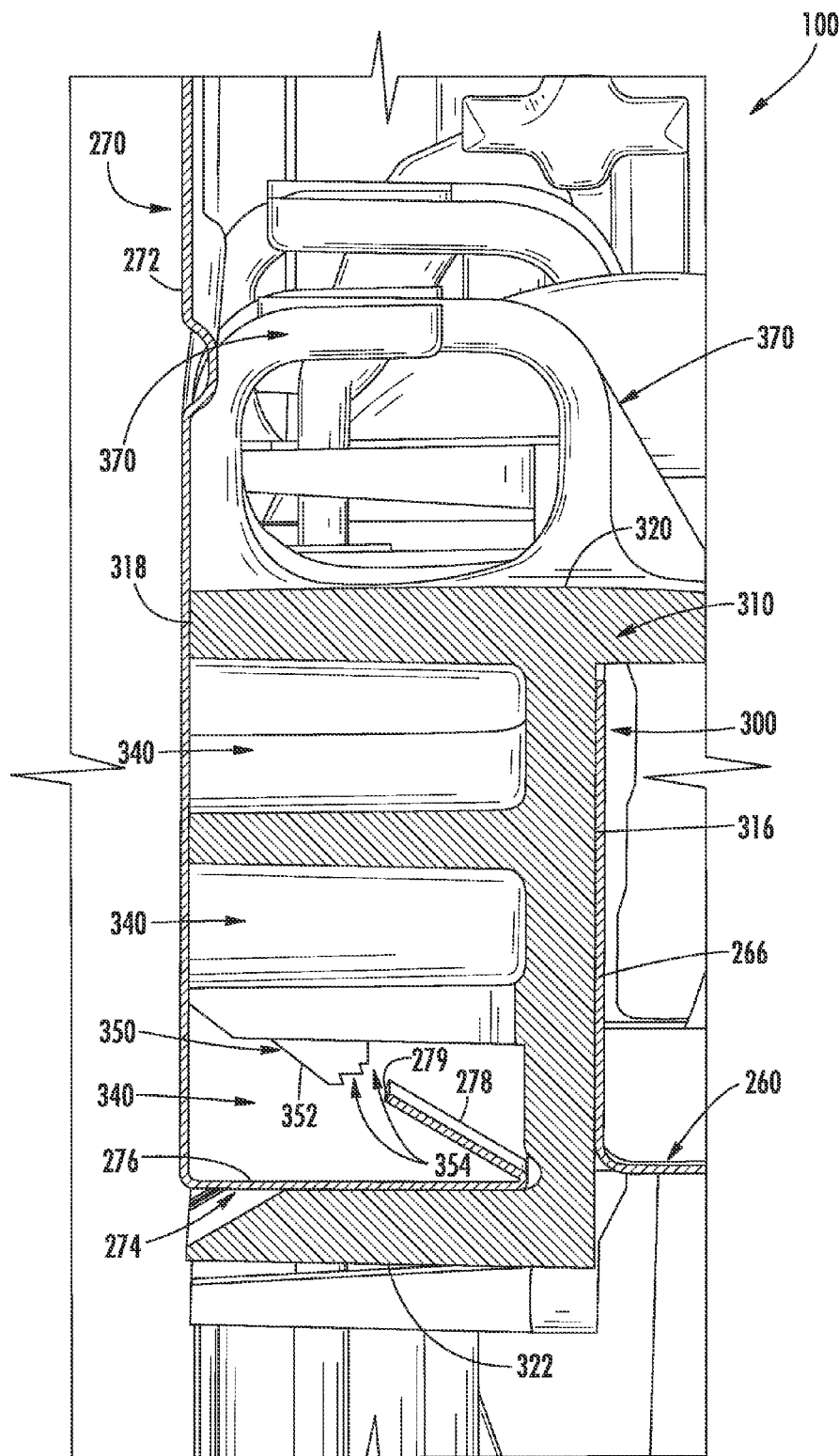
FIG. 8 is a cross-sectional view of a joint member connected between a back wall and a casing bottom of a casing of a refrigerator appliance in accordance with one embodiment of the present disclosure.

Referring now to FIGS. 4, 5, 8 and 9, in some embodiments, joint member 300 may further include one or more barrier channels 340. Each barrier channel 340 may be defined in the body 310, such as in the aft face 318 thereof. Further, each barrier channel 340 may extend generally along the lateral direction L between the first end 312 and the second end 314. When connected in refrigerator appliance 100, channels 340 may serve as barriers for foam attempting to escape from the interior 251, such as past the back wall 270-joint member 300 intersection. Referring to FIG. 8, as foam flows between the back wall 270 and the aft face 318, the foam may flow into a first channel 340. The foam may then need to fill this channel before progressing beyond the channel 340, such as to a subsequent channel 340. Accordingly, foam flow past the back wall 270-joint member 300 intersection is advantageously reduced or eliminated.

Figure 9:
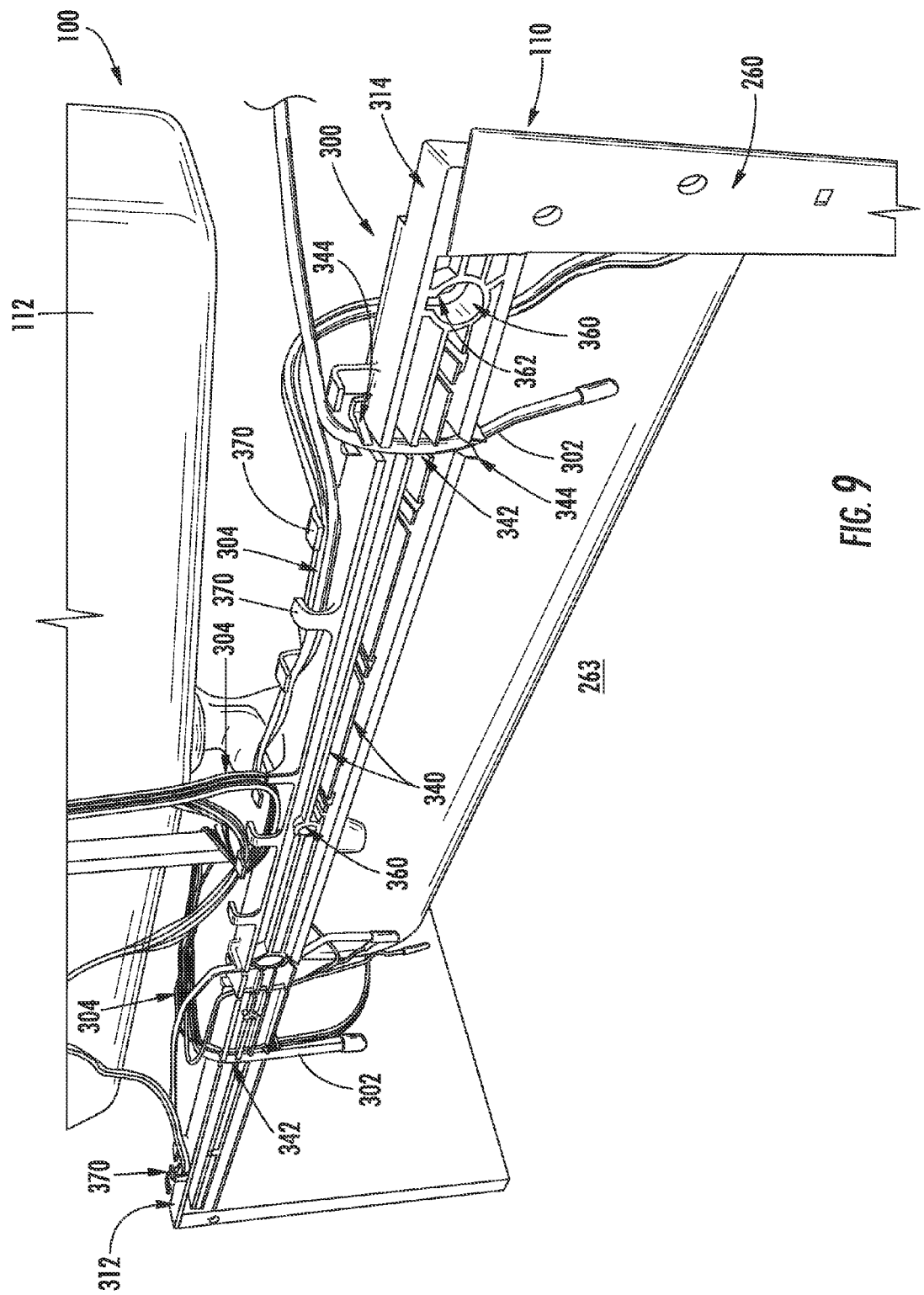
FIG. 9 is a perspective view of a joint member connected to a casing bottom of a casing of a refrigerator appliance (with a back wall removed for illustrative purposes) in accordance with one embodiment of the present disclosure.

Referring now to FIGS. 4, 5 and 9, in some embodiments, joint member 300 may further include one or more tube channels 342. Each tube channel 342 may be defined in the body 310, such as in the aft face 318 thereof. Further, each tube channel 342 may extend generally along the vertical direction V between the top surface 320 and the bottom surface 322. Tube channels 342 may, for example, in some embodiments intersect barrier channels 340. When assembled, tube channels 342 may each accommodate therein a tube 302 that is extending into the machinery compartment 263, such that the tubes 302 are advantageously accurately positioned for coupling with components in machinery compartment 263.

Further, in some embodiments, joint member 300 may additionally include one or more snap assemblies 344. Each snap assembly 344 may be aligned (such as along the vertical direction) with one of the plurality of tube channels 342, and may be configured to capture a tube 302 therein. For example, a snap assembly 344 may include opposing arms 346 which may be angled towards each other, and which may be resiliently movable away from each other. During assembly, a tube 302 may be positioned between the arms 346 of the snap assembly 344. The arms 346 may separate to allow a tube 302 to be positioned therebetween, and then move back into place to capture the tube 302 therebetween.

In exemplary embodiments, snap assemblies 344 may be integral with body 310. Alternatively, however, snap assemblies 344 may be separate components that are connected to body 310.

Figure 7:
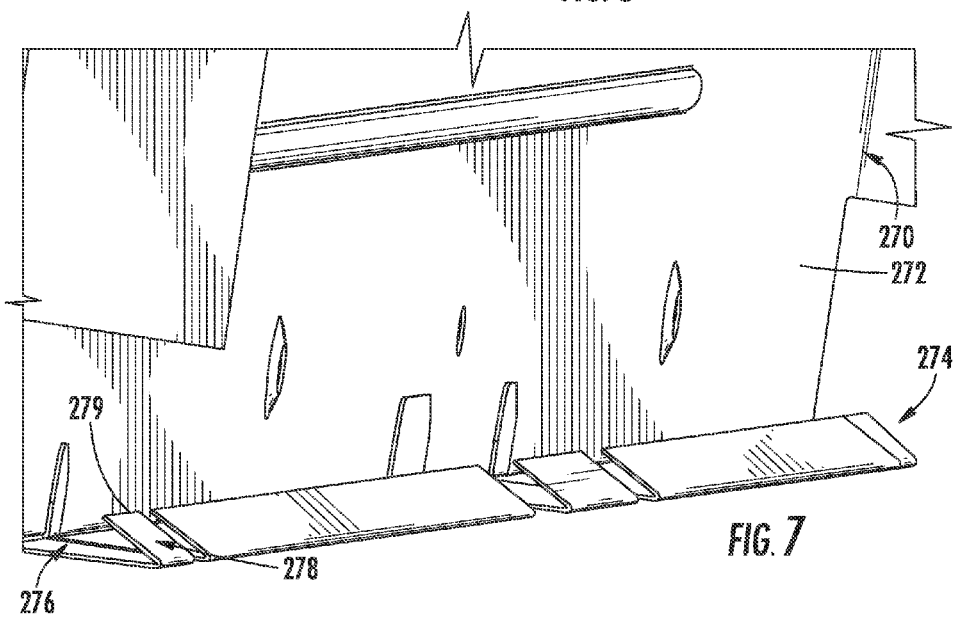
FIG. 7 is a front perspective view of a portion of a back wall of a casing of a refrigerator appliance in accordance with one embodiment of the present disclosure.

Referring now to FIGS. 5, 7 and 8, joint member 300 may, in addition to being connected to the casing bottom 260, be connected to the back wall 270. Advantageously, in exemplary embodiments no mechanical fasteners or bonding may be required for such connection. For example, as shown, lower flange 274 of back wall 270 may include a main plate 276 and a hook plate 278. The main plate 276 may extend from the body 272, such as generally along the transverse direction T, and may be disposed between the body 272 and hook plate 278. Hook plate 278 may be cantilevered from the main plate 276 generally towards the body 272. The hook plate 278, and flange 274 generally, may be configured to interact with components of the joint member 300 to connect the back wall 270 and joint member 300.

Joint member 300 may, for example, include a plurality of tabs 350. A cantilevered end 279 of the hook plate 278 may contact one or more tabs 350 to connect the back wall 270 and joint member 300. For example, a tab 350 may have a ramp surface 352 and a plurality of steps 354. During assembly, the hook plate 278 may be inserted into joint member 300, such as into a channel 340 adjacent the tabs 350. Hook plate 278 may be inserted past tabs 350, and hook plate 278 and/or tabs 350 may resiliently move to allow such insertion. Once hook plate 278 is past the ramp surface 352, the cantilevered end 279 may contact one or more steps 354, which may prevent removal of the hook plate 278 and thus connect the back wall 270 and joint member 300.

In exemplary embodiments, tabs 350 may be integral with body 310. Alternatively, however, tabs 350 may be separate components that are connected to body 310.

Referring now to FIGS. 4, 5 and 9, joint member 300 may further include one or more bosses 360, which may each define a bore hole 362. Bosses may, for example, extend generally along the transverse direction T. Bore holes 362 may extend through bosses 360 and body 310, such as generally along the transverse direction T. Bosses 360 may accommodate therein mechanical fasteners 364 for coupling the joint member 300 to various other components, such as the upper flange 266, lower flange 274, and machinery compartment cover plate 280. Advantageously, the use of bosses 360 to accommodate mechanical fasteners 364 therein may reduce or prevent the risk of damage to wires 304, by at least partially isolating the mechanical fasteners 364 from the wires 304.

In exemplary embodiments, bosses 360 may be integral with body 310. Alternatively, however, bosses 360 may be separate components that are connected to body 310.

Referring now to FIGS. 4, 6, 8 and 9, in some embodiments, joint member 300 may further include one or more hooks 370. Each hook 370 may be configured to hold wires 304 which extend through and/or around the hook 370. In exemplary embodiments, each hook 370 may extend from the top surface 320 of the joint member 300. Advantageously, the use of hooks 370 to capture wires 304 may further reduce or prevent the risk of damage to wires 304, by allowing the wires 304 to be directed to desirable locations wherein potential damage is relatively less likely.

In exemplary embodiments, hooks 370 may be integral with body 310. Alternatively, however, hooks 370 may be separate components that are connected to body 310.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator casing, comprising:
a main casing body, the main casing body comprising a first sidewall, a second sidewall spaced apart from the first sidewall along a lateral direction, and a top wall extending between the first sidewall and the second sidewall;
a casing bottom connected to the main casing body, the casing bottom comprising an upper flange extending generally along the lateral direction between the first sidewall and the second sidewall;
a back wall connected to the main casing body, the back wall comprising a lower flange extending generally along the lateral direction between the first sidewall and the second sidewall; and
a joint member comprising a body extending between a first end and a second end generally along the lateral direction, the joint member connected to the upper flange and the lower flange, the body comprising a top surface, a bottom surface, a forward face, and an aft face, and wherein a plurality of barrier channels are defined in a linear array in the aft ace between the top surface and the bottom surface, each of the plurality of barrier channels extending generally along the lateral direction between the first end and the second end, wherein the joint member further comprises a first protrusion extending from the body at the first end and a second protrusion extending from the body at the second end, the first protrusion disposed within a first pocket defined in the casing bottom, the second protrusion disposed within a second pocket defined in the casing bottom.

2. The refrigerator casing of claim 1, wherein the joint member is formed from a plastic.

3. The refrigerator casing of claim 1, wherein the casing bottom and the back wall are each formed from a metal.

4. The refrigerator casing of claim 1, wherein a plurality of tube channels are defined in the body of the joint member, each of the plurality of tube channels extending generally along a vertical direction between a top surface and a bottom surface of the joint member.

5. The refrigerator casing of claim 4, wherein the joint member further comprises a plurality of snap assemblies, each of the plurality of snap assemblies aligned with one of the plurality of tube channels.

6. The refrigerator casing of claim 1, wherein the lower flange comprises a main plate and a hook plate cantilevered from the main plate generally towards a body of the back wall, and wherein the joint member comprises a plurality of tabs, and wherein a cantilevered end of the hook plate of the lower flange contacts the plurality of tabs to connect the back wall and the joint member.

7. The refrigerator casing of claim 1, wherein the joint member further comprises a plurality of bosses, each of the plurality of bosses extending generally along the transverse direction.

8. The refrigerator casing of claim 1, further comprising a machinery compartment cover plate connected to the casing bottom and the joint member.

9. The refrigerator casing of claim 1, wherein the joint member further comprises a plurality of hooks.

10. The refrigerator casing of claim 9, wherein each of the plurality of hooks extends from a top surface of the joint member.

11. A refrigerator casing, comprising:
a main casing body, the main casing body comprising a first sidewall, a second sidewall spaced apart from the first sidewall along a lateral direction, and a top wall extending between the first sidewall and the second sidewall;

a casing bottom connected to the main casing body, the casing bottom comprising an upper flange extending generally along the lateral direction between the first sidewall and the second sidewall;

a back wall connected to the main casing body, the back wall comprising a lower flange extending generally along the lateral direction between the first sidewall and the second sidewall; and a joint member comprising a body extending between a first end and a second end generally along the lateral direction, the joint member connected to the upper flange and the lower flange, the joint member comprising a first protrusion extending from the body at the first end and a second protrusion extending from the body at the second end, the first protrusion disposed within a first pocket defined in the casing bottom, the second protrusion disposed within a second pocket defined in the casing bottom.

12. The refrigerator casing of claim 11, wherein a plurality of tube channels are defined in the body of the joint member, each of the plurality of tube channels extending generally along a vertical direction between a top surface and a bottom surface of the joint member.

13. The refrigerator casing of claim 12, wherein the joint member further comprises a plurality of snap assemblies, each of the plurality of snap assemblies aligned with one of the plurality of tube channels.

14. The refrigerator casing of claim 11, wherein the lower flange comprises a main plate and a hook plate cantilevered from the main plate generally towards a body of the back wall, and wherein the joint member comprises a plurality of tabs, and wherein a cantilevered end of the hook plate of the lower flange contacts the plurality of tabs to connect the back wall and the joint member.

15. A refrigerator casing, comprising:

a main casing body, the main casing body comprising a first sidewall, a second sidewall spaced apart from the first sidewall along a lateral direction, and a top wall extending between the first sidewall and the second sidewall;

a casing bottom connected to the main casing body, the casing bottom comprising an upper flange extending generally along the lateral direction between the first sidewall and the second sidewall;

a back wall connected to the main casing body, the back wall comprising a lower flange extending generally along the lateral direction between the first sidewall and the second sidewall, wherein the lower flange comprises a main plate and a hook plate cantilevered from the main plate generally towards a body of the back wall; and a joint member comprising a body extending between a first end and a second end generally along the lateral direction, the joint member connected to the upper flange and the lower flange, wherein the joint member comprises a plurality of tabs, wherein a cantilevered end of the hook plate of the lower flange contacts the plurality of tabs to connect the back wall and the joint member.

16. The refrigerator casing of claim 15, wherein a plurality of tube channels are defined in the body of the joint member, each of the plurality of tube channels extending generally along a vertical direction between a top surface and a bottom surface of the joint member.

17. The refrigerator casing of claim 16, wherein the joint member further comprises a plurality of snap assemblies, each of the plurality of snap assemblies aligned with one of the plurality of tube channels.

18. The refrigerator casing of claim 15, wherein the joint member further comprises a plurality of bosses, each of the plurality of bosses extending generally along the transverse direction.

* * * * *